(12) United States Patent
Stache et al.

(10) Patent No.: US 8,788,359 B2
(45) Date of Patent: Jul. 22, 2014

(54) VENDING MACHINE INFORMATION

(75) Inventors: Oliver Joerg Stache, Niederkruechten (DE); Antonio Solano Tarroc, Madrid (ES); Andreas Nils Walter Cronstrom, Malmo (SE); Susana Margarida Cardim Cabaco, Carnaxide (PT); Tiago Andre Dias Do Naschiento Pergira Camilo, Quinta do Anjo (PT); Damian Czernous, Wroclaw (PL)

(73) Assignee: Cumulocity GmbH, Duesseldorf (DE)

( * ) Notice: Subject to any disclaimer, the term of this patent is extended or adjusted under 35 U.S.C. 154(b) by 0 days.

(21) Appl. No.: 13/151,418

(22) Filed: Jun. 2, 2011

(65) Prior Publication Data

US 2012/0310776 A1    Dec. 6, 2012

(51) Int. Cl.
*G06Q 30/00*    (2012.01)

(52) U.S. Cl.
USPC .......................................................... 705/26.1

(58) Field of Classification Search
USPC .......................................................... 705/26.1
See application file for complete search history.

(56) References Cited

U.S. PATENT DOCUMENTS

| | | | |
|---|---|---|---|
| 2004/0229565 A1* | 11/2004 | Himeno | 455/41.2 |
| 2005/0102233 A1* | 5/2005 | Park et al. | 705/44 |
| 2008/0093444 A1 | 4/2008 | Chung et al. | |
| 2008/0172340 A1* | 7/2008 | Karlsson | 705/75 |
| 2011/0302014 A1* | 12/2011 | Proctor et al. | 705/14.23 |
| 2012/0167195 A1* | 6/2012 | McQuaide, Jr. | 726/9 |

FOREIGN PATENT DOCUMENTS

| | | |
|---|---|---|
| JP | 2007-052798 A | 3/2007 |
| WO | WO 02/09005 A1 | 1/2002 |

OTHER PUBLICATIONS

International Search Report and Written Opinion dated Aug. 28, 2012 corresponding to International Patent Application No. PCT/EP2012/060148.

* cited by examiner

*Primary Examiner* — Mila Airapetian
(74) *Attorney, Agent, or Firm* — Curran Patent Law; Kevin M. Curran, Esq.

(57) ABSTRACT

A method is described for displaying vending machine product data using a display of a mobile communication device. This has the advantage of using the superior display of the mobile communication device and increasing the functionality available to the end user, without needing to invest in expense display equipment at the vending machine itself). The mobile communication device can also be used to order one or more products from the vending machine.

13 Claims, 3 Drawing Sheets

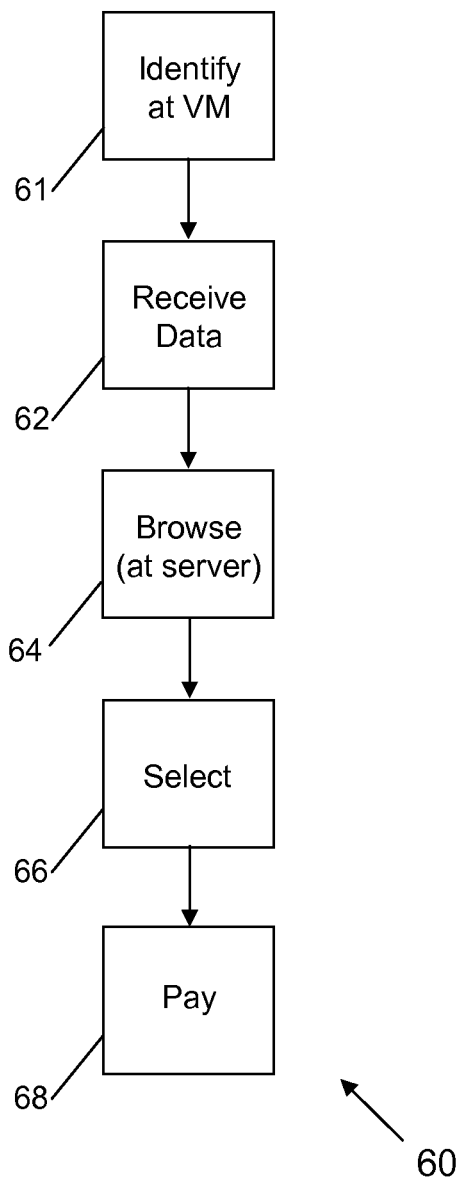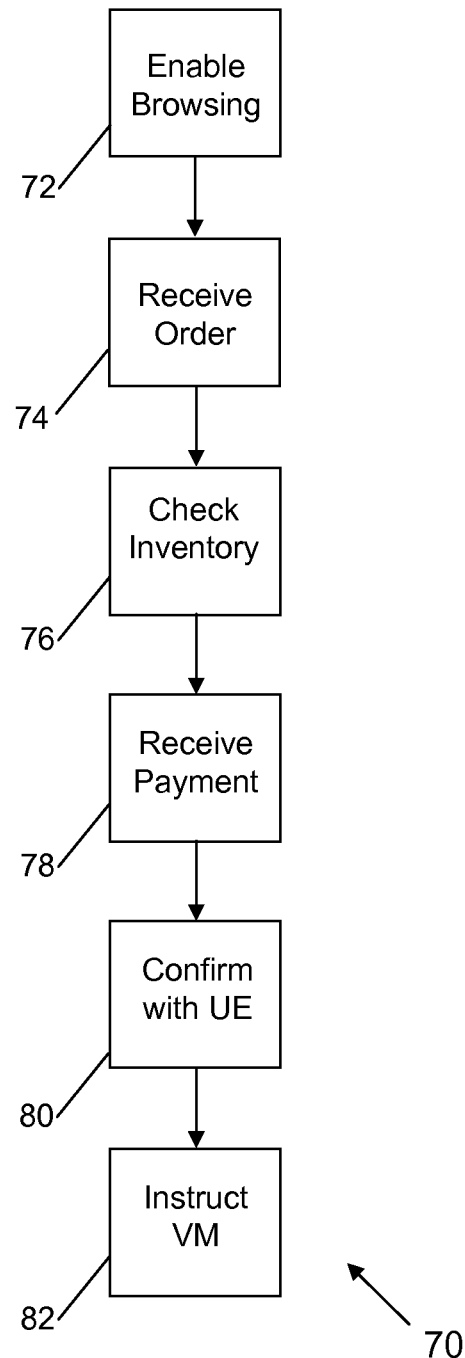
Fig. 6
Fig. 7

VENDING MACHINE INFORMATION

The invention relates to vending machines. In particular, the invention relates to vending machines that are able to interact with other devices, such as mobile communication devices.

Vending machine technology is well established. Such machines typically dispense relatively low value items, such as snacks and drinks, in significant quantities.

Vending machines are not generally flexible. Products are available at fixed prices and, when sold out, need to be replaced. The period of such replacements can be unpredictable. Vending machines also do not typically allow users to order products remotely, nor do they typically allow either users or vending machine providers to check on the availability of stock at a particular vending machine without visiting the machine in person.

A further problem with vending machines is the lack of user-interaction. Many consumers require significant information regarding a product before they are willing to buy it. For example, some consumers have specific dietary requirements, for example due to allergies, dieting and/or fitness regimes, or ethical concerns (such as a desire to avoid meat products, or to purchase products manufactured in accordance with certain ethical principles).

It is technically possible to provide vending machines with substantial user-interaction. For example, video screens can be provided to present information to users and graphical user-interfaces can be provided to enable users to browse available information. However, providing such interaction is expensive. Since vending machines typically dispense inexpensive products with small profit margins, the cost of providing, maintaining and upgrading such interaction capability is prohibitive. Moreover, given the fragmented nature of the vending machine industry, individual vending machine providers are not typically able to make the financial commitment necessary to provide such services to end users.

The present invention seeks to address at least some of the problems outlined above.

The present invention provides a method (typically carried out by a user) comprising: using a mobile communication device to communicate with a vending machine; displaying vending machine product data using a display of the mobile communication device; and using the mobile communication device to order one or more products (from the vending machine or from (or via) a server). Using the mobile communication device display has the advantage of using the superior display of the mobile communication device and increasing the functionality available to the end user, without needing to invest in expense display equipment at the vending machine itself.

At least some of the product data may be stored at the vending machine. Alternatively, or in addition, at least some of the product data is stored at a server remote from the vending machine.

The invention may further comprise using the mobile communication device to browse information relating to one or more products available for sale at the vending machine. Browsing could be via the vending machine (i.e. based on data stored at the vending machine). Alternatively, browsing could be via the server (i.e. based on data stored at the server).

The mobile communication device may communicate with the vending machine using a near-field communication interface at the vending machine. Alternative communication systems could be used, such as Bluetooth.

In some forms of the invention, payment for the order is made at a server remote from the vending machine. This is not essential to all forms of the invention. For example, payment could be made at the vending machine.

The present invention also provides a method (typically carried out at a vending machine) comprising: identifying the presence of a mobile communication device at a vending machine; providing vending machine product data to the mobile communication device for display to a user of the mobile communication device (this could be actual product data, or it could be a link to the relevant server to enable the mobile communication device to communicate with a server); obtaining order information including details of an ordered product (could be from the mobile communication device or from the relevant server); and dispensing the ordered product.

The invention may further comprise enabling the user to obtain further product information from a remote server. This may be achieved, for example, by sending a link to the mobile communication device.

The mobile communication device may communicate with the vending machine using a near-field communication interface at the vending machine.

The method may further comprise receiving payment for the ordered product.

The present invention further provides a mobile communication device comprising: a first interface (such as a near-field communication interface) configured to receive vending machine product information from a vending machine; a display for displaying the vending machine product data; and a user interface configured to receive user instructions regarding whether or not to order one or more products from the vending machine.

The mobile communication device may further comprise a second interface configured to receive further vending machine product information from a server remote from the vending machine.

The mobile communication device may further comprise a third interface for paying for an ordered vending machine product.

The invention yet further provides a vending machine comprising: a first interface (such as a near-field communication interface) configured to identify the presence of a mobile communication device and for providing vending machine product data to the mobile communication device for display to a user of the mobile communication device; a second interface (which may be the same as the first interface) configured to obtain order information from the mobile communication device; and a product dispenser for dispensing an ordered product.

The present invention also provides a computer program comprising: code (or some other means) for using a mobile communication device to communicate with a vending machine; code (or some other means) for displaying vending machine product data using a display of the mobile communication device; and code (or some other means) for using the mobile communication device to order one or more products (from the vending machine or from (or via) a server). The computer program may be a computer program product comprising a computer-readable medium bearing computer program code embodied therein for use with a computer.

The present invention further provides a computer program comprising: code (or some other means) for identifying the presence of a mobile communication device at a vending machine; code (or some other means) for providing vending machine product data to the mobile communication device for display to a user of the mobile communication device (this could be actual product data, or it could be a link to the relevant server to enable the mobile communication device to communicate with a server); code (or some other means) for obtaining order information including details of an ordered product (could be from the mobile communication device or from the relevant server); and code (or some other means) for dispensing the ordered product. The computer program may be a computer program product comprising a computer-readable medium bearing computer program code embodied therein for use with a computer.

Exemplary embodiments of the invention are described below, by way of example only, with reference to the following numbered drawings.

FIG. 6 is a flow chart showing an algorithm in accordance with an aspect of the present invention; and FIG. 7 is a flow chart showing an algorithm in accordance with an aspect of the present invention.

Figure 1:
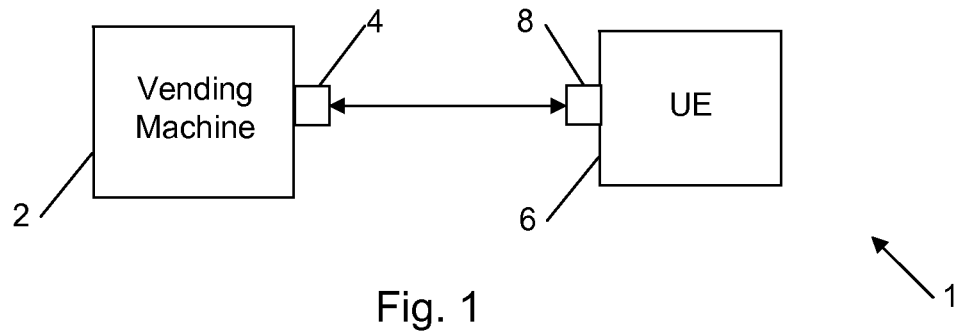
FIG. 1 is a block diagram of a system in accordance with an aspect of the present invention.

FIG. 1 is a block diagram of a system, indicated generally by the reference numeral 1, in accordance with an aspect of the present invention. The system 1 comprises a vending machine 2 and a mobile communication device 6. The vending machine 2 includes a near-field communication (NFC) module 4. The mobile communication device also includes a near-field communication module 8.

The near field communication (NFC) modules 4 and 8 are able to communicate with one another when the mobile communication device 6 is close to the vending machine 2. Typically, near field communication modules are able to communicate with one another only when they are separated by a few centimeters although, in principle, the technology could be applied to allow communication over larger distances.

The near field communication (NFC) modules 4 and 6 allow the vending machine to provide data to the mobile communication device 6 for display.

Figure 2:
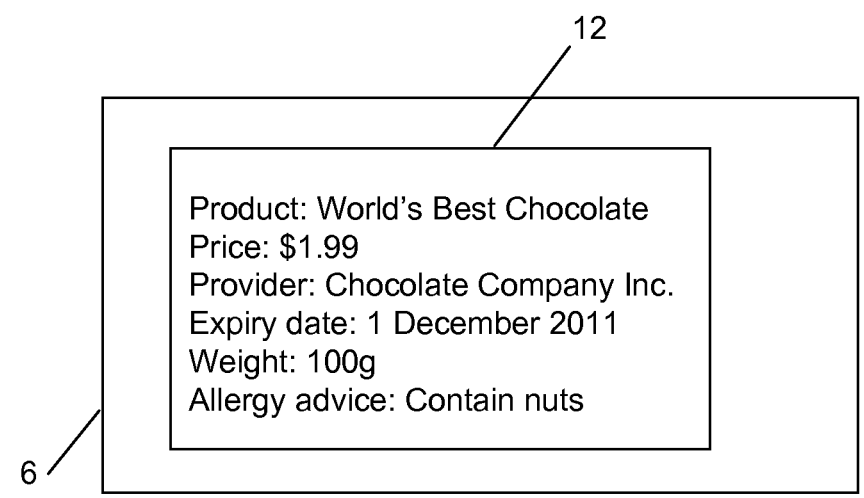
FIG. 2 shows a display in accordance with an aspect of the present invention.

FIG. 2 shows the mobile communication device 6. As shown in FIG. 6, the device 6 has a display 12 that provides information concerning a product (in this case a product called "World's Best Chocolate"). As shown in FIG. 2, the information displayed includes price ($1.99), the provider (Chocolate Company Inc.), the expiry date (1 Dec. 2011), the weight of the product (100 g) and allergy advice (contains nuts). Of course, any information could be displayed and the display in not limited to text (logos and images could readily be displayed, as could video images). The display shown in FIG. 2 is provided by way of example only.

Figure 3:
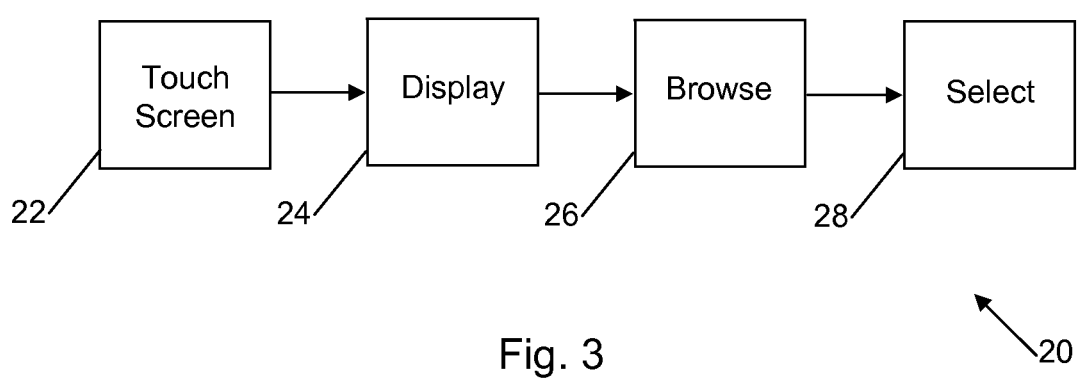
FIG. 3 is a flow chart showing an algorithm in accordance with an aspect of the present invention.

FIG. 3 is a flow chart showing an algorithm, indicated generally by the reference numeral 20, showing an exemplary use of the system 1.

The algorithm 20 starts at step 22, where the NFC module 8 of the mobile communication device 6 is presented to the NFC module 4 of the vending machine 2. When the device 6 is recognised at the vending machine, data for display on the mobile device 6 is transferred over the NFC connection. This data is displayed on the mobile communication device 6 (step 24).

The user of the mobile communication device 6 can now browse the information displayed on the screen 12 (step 26) and can select a product to buy from the vending machine 2 (step 28). By way of example, in the step 26, the user may browse through the various products available form the vending machine he is standing in front of using the mobile communication device 6. Alternatively, or in addition, the user may use the mobile communication device browser to obtain further details regarding a particular product available from the vending machine.

The purchase may be completed using the NFC connection between the vending machine 2 and the mobile communication device 6. Alternatively, the display of the mobile communication device 6 can be used as a display only, with the product being purchased from the vending machine in a conventional manner.

Figure 4:
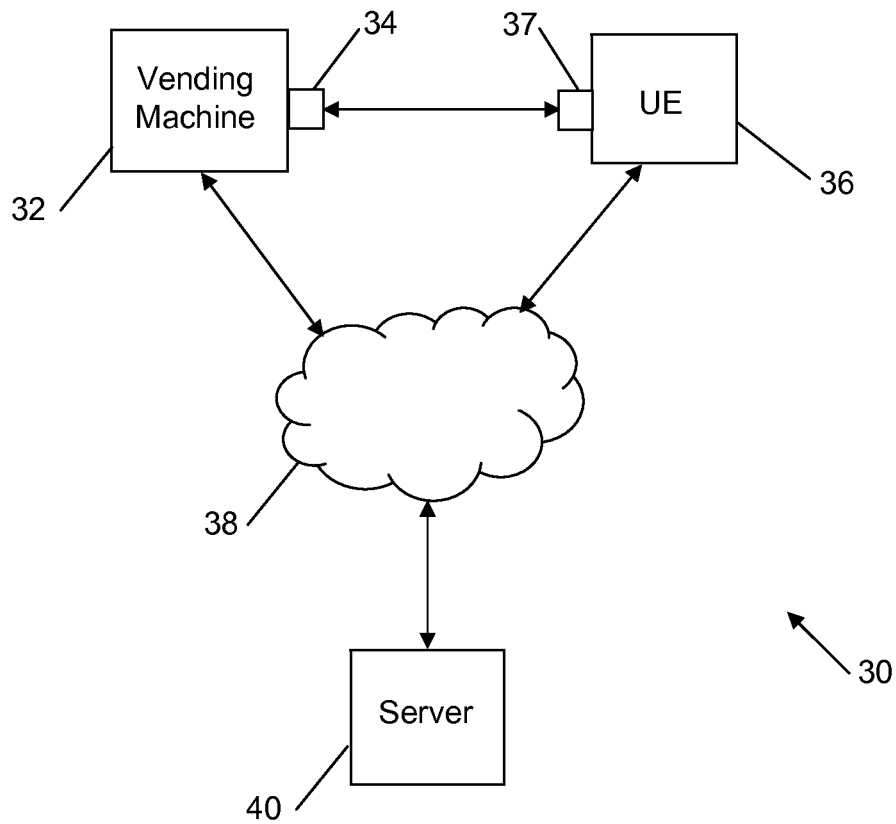
FIG. 4 is a block diagram of a system in accordance with an aspect of the present invention

The system 1 requires data for display on the mobile communication device 6 to be stored at the vending machine 2 and transmitted over the NFC connection. Typically, data storage available at the vending machine 2 will be limited, as will the capability of the data connection between the vending machine 2 and the mobile communication device 6. Accordingly, there are advantages to enabling the mobile communication device 6 to interact with a remote server. This can be enabled by the system 30 described below with reference to FIG. 4.

The system 30 comprises a vending machine 32 having a near field communication (NFC) module 34, a mobile communication device 36 having a near field communication (NFC) module 37, a network 38 and a server 40. The network 38 could take many different forms, such as a proprietary network or the Internet.

In the system 30, the vending machine 32, mobile communication device 36 and server 40 are able to communicate with one another via the network 38. In the use of the system, the mobile communication device may obtain information (for example relating to products available from the vending machine 32) from the vending machine 32 (in a similar manner to the system 1). Alternatively, or in addition, the mobile communication device 36 may obtain information from the server 40. In many forms of the invention, some initial information may be obtained from the vending machine 32 using the NFC connection and if the user requires further information, that information can be obtained from the server 40.

Figure 5:
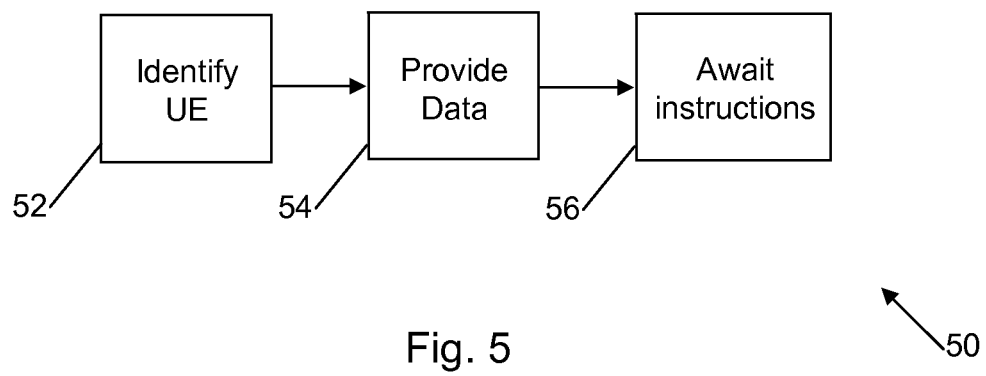
FIG. 5 is a flow chart showing an algorithm in accordance with an aspect of the present invention.

FIGS. 5 to 7 are flow charts showing aspects of an exemplary implementation of the present invention. The flow chart of FIG. 5 (indicated generally by the reference numeral 50) shows the steps of the exemplary implementation as carried out at the vending machine 32. The flow chart of FIG. 6 (indicated generally by the reference numeral 60) shows the steps of the exemplary implementation as carried out at the mobile communication device 36. The flow chart of FIG. 7 (indicated generally by the reference numeral 70) shows the steps of the exemplary implementation as carried out at the server 40.

The algorithm 50 shown in FIG. 5 starts at step 52 where the mobile communication device 36 is identified at the vending machine 32. This is typically carried out when the NFC module 37 of the mobile communication device is presented at the NFC module 34 of the vending machine 32. The step 52 is therefore similar to the step 22 described above.

Next, at step 54, the vending machine provides information for display at the mobile communication device. The information for display may include a link to a location of the server 40 where further information regarding products available from the vending machine can be found. Indeed, in some forms of the invention, the only data transferred from the vending machine 32 to the mobile communication device 36 in the step 54 is one or more links to further data available from the server 40.

With the relevant information provided to the mobile communication device 36, the vending machine simply waits for further instructions (step 56 of the algorithm 50). As described further below, further instructions may come from the mobile communication device 36, from the server 40 or simply from the user directly at a user interface of the vending machine. It should be noted that if the vending machine is not required to communicate directly with the server 40, then the connection between the vending machine 32 and the network 38 shown in FIG. 4 may be omitted.

As indicated above, the algorithm 60 shown in FIG. 6 shows the steps of the exemplary implementation as carried out at the mobile communication device 36.

The algorithm 60 starts at step 61, where the mobile communication device 36 is presented at the NFC reader 34 of the vending machine 32. Thus, step 61 matches with step 52 of the algorithm 50.

As described above, the vending machine sends data to the mobile communication device (step 54). This data is received at the mobile communication device 36 in step 62 of the algorithm 60.

As discussed above, the data sent in step 54 (and received in step 62) includes one or more links to locations at the server 40 where further information can be found. If the user requires further information, the user can browse information available at the server using the links provided by the vending machine (step 64 of the algorithm 60, which step is optional in many implementations of the invention).

Next, at step 66, the user selects a product for purchase. This step can be implemented in many ways. For example, an order may be placed at the server 40. Alternatively, an order may be placed at the vending machine (via the NFC link between the mobile device and the vending machine). In a further alternative, the user may simply interact directly with a user interface of the vending machine (and may not therefore need to use the mobile communication device 36 to place the order at all).

Finally, the user pays for the product (step 68). Again, this could be implemented using the mobile communication device 32, either in communication with the server or the vending machine. Alternatively, the user may simply interact directly with a user interface of the vending machine (and may not therefore need to use the mobile communication device 36 to pay).

As indicated above, the algorithm 70 shown in FIG. 7 shows the steps of the exemplary implementation as carried out at the server 40.

The algorithm 70 starts at step 72, where the server allows the mobile communication device 36 to browse data stored at the server 40. In some implementations of the invention, the algorithm 70 includes only this step—the other steps shown in FIG. 7 are optional. For example, the mobile communication device 32 may use the server 40 to obtain further data concerning products available from the vending machine 32 and, once sufficient data has been obtained to satisfy the user, all further communications may be between the mobile communication (or the user) and the vending machine.

At step 74, if implemented, the server 40 receives an order from the mobile communication device 32. In response to receiving the order, the server 40 may check an inventory to ensure that the ordered product is available (step 76). Next, the server may obtain payment (step 78) and may send a message to the mobile communication device confirming the order (step 80). Finally, the server 40 may send a message to the vending machine 82 instructing the vending machine to dispense the product.

Some or all of the steps 74 to 82 of the algorithm 70 may be omitted. For example, the server may not perform an inventory check before completing the order. Furthermore, the server may not handle payments for the product (this may be done directly at the vending machine, for example).

The embodiments of the invention described above describe the use of near field communication (NFC) modules to enable the mobile communication device of the user and the vending machine to communicate with one another. This is not essential to all forms of the invention. Other wireless communication systems, such as Bluetooth or cellular mobile systems could readily be used.

The embodiments of the invention described above are illustrative rather than restrictive. It will be apparent to those skilled in the art that the above devices and methods may incorporate a number of modifications without departing from the general scope of the invention. It is intended to include all such modifications within the scope of the invention insofar as they fall within the scope of the appended claims.

The invention claimed is:

1. A method, comprising:
commencing an order by presenting a first near-field communication interface of a mobile communication device at a second near-field communication interface of a vending machine;
identifying a presence of the mobile communication device at the vending machine using near-field communication;
providing initial information to the mobile communication device using the near-field communication;
providing vending machine product data to the mobile communication device from a server remote from the vending machine, for display to a user of the mobile communication device;
obtaining order information including details of an ordered product; and
dispensing the ordered product.

2. The method of claim 1, further comprising using the mobile communication device to browse further information relating to one or more products available for sale at the vending machine.

3. The method of claim 2, wherein at least some of the product data is stored at the server remote from the vending machine.

4. The method of claim 2, wherein at least some of the product data is stored at the vending machine.

5. The method of claim 1, wherein payment for the order is made at a server remote from the vending machine.

6. The method of claim 1, wherein the mobile communication device obtains the order information, including the details of the ordered product, from the vending machine using the near-field communication.

7. The method of claim 3, further comprising using a second interface to receive the further information from the server remote from the vending machine, the second interface not using near-field communication.

8. The method of claim 7, wherein the mobile communication device uses a third interface for paying for the ordered product, wherein the third interface is not a near-field communication interface.

9. The method of claim 2, wherein the near-field communication is used for providing the vending machine product information to the mobile communication device for display to the user of the mobile communication device; and wherein the vending machine product data include a link to a location on the remote server where the further information relating to one or more products available for sale at the vending machine can be found.

10. A computer program product comprising computer readable executable code which, when run on a processor, controls said processor to perform a method comprising:
commencing an order by presenting a first near-field communication interface of a mobile communication device at a second near-field communication interface of a vending machine;
identifying a presence of the mobile communication device at the vending machine using near-field communication;
providing initial information to the mobile communication device using the near-field communication;
providing vending machine product data to the mobile communication device from a server remote from the vending machine, for display to a user of the mobile communication device;
obtaining order information including details of an ordered product; and
dispensing the ordered product.

11. The computer program product of claim 10, the method further comprising:
displaying the vending machine product data using a display of the mobile communication device; and
using the mobile communication device to order one or more products.

12. A system, comprising:
a mobile communication device,
a vending machine; and
a remote server;
wherein the mobile communication device comprises a first near-field communication interface;
wherein the vending machine comprises a second near-field communication interface configured to identify a presence of the first near-field communication interface of the mobile communication device;
wherein the mobile communication device and the vending machine are configured such that commencement of an order involves presenting the first near-field communication interface of the mobile communication device at the second near-field communication interface of the vending machine;
wherein initial information is provided to the mobile communication device using the near-field communication;
wherein vending machine product data are provided to the mobile communication device from a remote server for display to a user of the mobile communication device;
wherein the mobile communication device comprises a user interface configured to receive user instructions regarding whether or not to order one or more products from the vending machine; and
wherein the vending machine comprises a product dispenser for dispensing the ordered product.

13. The system of claim 12, wherein the mobile communication device comprises a second interface configured to receive further vending machine product information from the server remote from the vending machine.

* * * * *